Sept. 29, 1959 G. F. HODSMAN 2,906,519
ARRESTING MECHANISM FOR ANALYTICAL BALANCES
Filed March 31, 1955
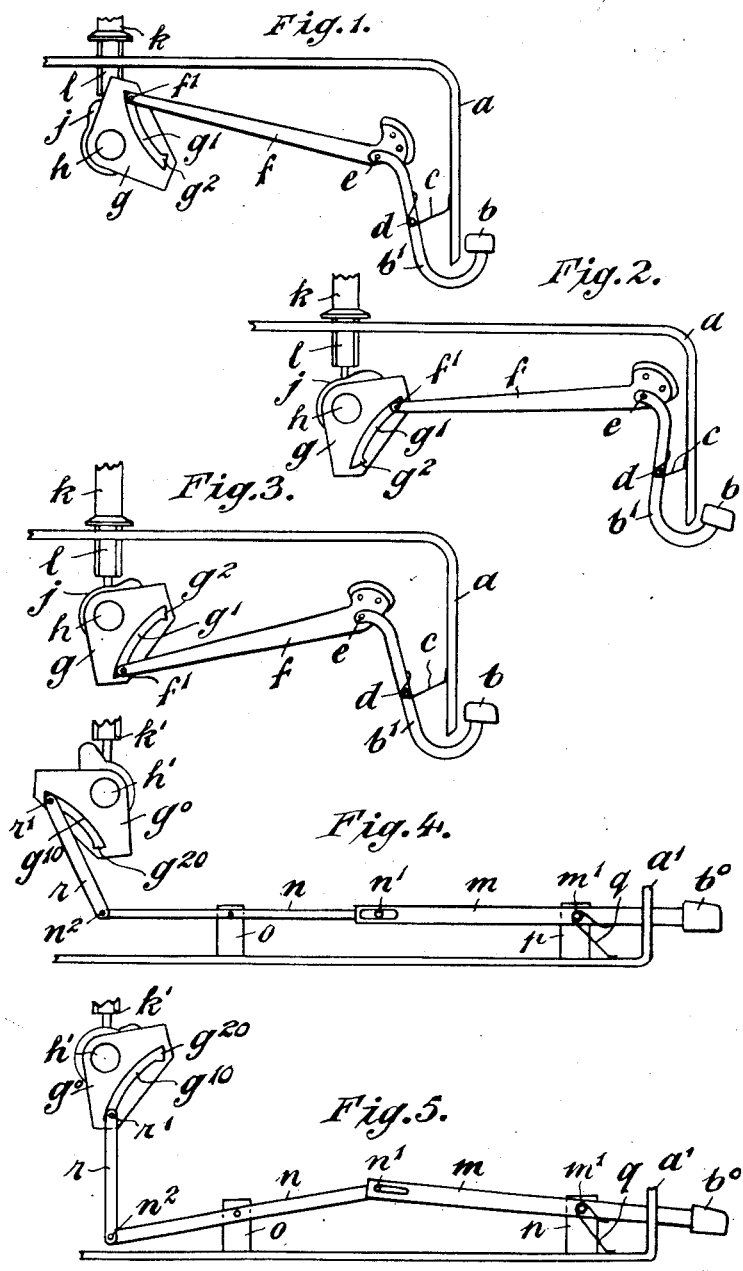
INVENTOR
George Francis Hodsman
By Morris & Bateman
ATTORNEYS

United States Patent Office 2,906,519
Patented Sept. 29, 1959

2,906,519

ARRESTING MECHANISM FOR ANALYTICAL BALANCES

George Francis Hodsman, Petts Wood, England, assignor to L. Oertling Limited, Orpington, England, a British company Application March 31, 1955, Serial No. 498,415

6 Claims. (Cl. 265—49)

This invention has reference to improvements connected with analytical balances, and has for its particular object an improved construction and arrangement of trip release mechanism for effecting the operation of the release or arrestment mechanism usually associated with balances of this character.

The invention consists of an improved relieving or arrestment mechanism for use in combination with an analytical balance, characterised by a manually actuated control bar associated with a spring which serves to effect a dual operation of the cam controlled relieving or arrestment mechanism in both directions.

The invention will now be described with reference to the accompanying drawings in which two alternative means of carrying the present invention into practice are illustrated.

In the one embodiment diagrammatically illustrated by Figs. 1, 2 and 3 the views are in side elevation and illustrate stages in the operation of the relieving or arrestment mechanism while in the second embodiment illustrated diagrammatically by the Figs. 4 and 5 the device is shown in two of its stages of operation.

Referring first to Figs. 1, 2 and 3, Fig. 1 illustrates the control mechanism in the relieved or arrested position of the balance. Fig. 2 represents the position of the control mechanism seen in Fig. 1 when the control bar has been and is held depressed, while Fig. 3 shows the position of the control mechanism when the control bar has been released.

In the illustrated embodiment the base of the machine is formed by a compartment located below the base plate $a$. The control mechanism located therein is operated through the medium of a control bar $b$ which takes the form of a spacing bar of a typewriter and extends along the front of the machine and is pivotally connected to the housing of the base by the axle $d$. This bar is also connected to the housing of the base through a blade spring $c$ one end whereof is anchored to the base plate $a$ while the other limb bears against the edge of the control bar lever $b^1$, the spring being in part wound around the axle $d$. The inner end of the control bar lever $b^1$ is pivotally connected at $e$ to one end of a motion transmitting linkage here consisting of an arm link $f$, the one end whereof is counterweighted. A laterally extending pin $f^1$ fixed on the arm $f$ can move through the slot $g^1$ formed in a rockable quadrant $g$. The ends of the slot $g^1$ are formed with contiguous notches $g^2$ for a purpose to be hereinafter described. The rockable quadrant $g$ is fixed on a shaft $h$ which also carries a plurality of cams $j$, one of these cams being associated with the vertically disposed rod $k$ which is connected to the relieving or arrestment frame while the other cams on this rod co-operate with pan stops $l$ which serve to retain the scale pans in their lifted or relieved position when necessary.

When the control bar is initially depressed from the position seen in Fig. 1 to the position seen in Fig. 2, the slotted quadrant $g$ is rotated in a clockwise direction through an arc determined by the stroke of the arm $f$. This depression of the control bar $b$ through pin and slot connection $f^1$ $g^1$ effects a clockwise motion as seen by a comparison of these figures of the drawings. This rotation of the slotted quadrant and shaft $h$ rocks the cams $j$ and thereby lowers the rod $k$ and pan stops $l$ which brings the weighbeam and its dependent parts into the operative position consequent upon the lowering of the relieving or arrestment frame mounted at the upper end of the rod $k$. When the control bar $b$ is released as seen in Fig. 3 it is returned to its normal or raised position by the energy of the spring $c$ and this admits of the traverse of the pin $f^1$ along the slot $g^1$ until the pin is located within the lowermost notch $g^2$. A subsequent depression of the control bar $b$ causes the pin $f^1$ which is engaged within the lower-most notch $g^2$ of the slot $g^1$ to effect an anti-clockwise motion of the slotted quadrant $g$ and of the shaft $h$ and the cams $j$ which are thus returned to the position seen in Fig. 1 of the drawings which is the relieved or arrested position of the mechanism. The subsequent release of the control bar through the agency of the spring $c$ causes the pin $f^1$ at the one end of the arm $f$ to traverse up the arcuate slot $g^1$ to engage the uppermost notch $g^2$ therein as seen in Fig. 2 when the cycle of operation can be repeated, the two successive depressions of the control bar completing the cycle of operation hereinbefore referred to.

Referring now to Figs. 4 and 5 of the drawings which illustrate a modified form of the mechanism for actuating the cam $j^0$ controlling the arrestment or relieving frame as seen in Figs. 1, 2 and 3, Fig. 4 illustrates the mechanism in the position which corresponds to that seen in Fig. 1 when the balance is in what is termed the relieved or arrested position with the rod $k$ in its raised position and Fig. 5 corresponds to Fig. 2 when the balance is in its operative or weighing position prior to the final releasing operation of the control bar.

In this modified form the control bar $b^0$ is located at the outer end of the slotted lever $m$ the slot wherein is adapted to be engaged by a pin $n^1$ in an even-armed lever $n$ fulcrummed on the bracket $o$ on the base of the machine. The lever $m$ is fulcrummed on the bracket $p$, the fulcrum pin $m^1$ forming an anchorage for a double limbed blade spring $q$ which functions somewhat in the manner of the blade spring $c$ referred to in Figs. 1, 2 and 3 of the drawings.

The one end of the lever $n$ is connected by a pin $n^2$ to a link $r$ which at its upper end carries a laterally extending pin $r^1$ adapted to engage within and traverse the arcuate slot $g^{10}$ formed in the rockable quadrant $g^0$ mounted on the shaft $h^1$ in the manner of the description of Figs. 1 to 3 to actuate the rod $k^1$ connected to the relieving or arrestment mechanism, the functional operation being similar in all respects to that already described with reference to the other construction of the mechanism. Lever $n$ and link $r$ constitute a motion transmitting linkage between the control bar and the quadrant.

I claim:

1. A relieving or arrestment mechanism for an analytical balance comprising a rotatable shaft, cam means on said shaft operatively connected to said mechanism for controlling the motion of said mechanism in a direction to render the balance operative or in a direction to arrest the balance, and control means for said cam means comprising a quadrant secured to said shaft and having an arcuate slot, a control bar, a pivoted lever on which said control bar is mounted, motion transmitting linkage pivoted at one end to said lever and at its other end having a pin disposed pivotally and slidably in said slot, and a spring operatively connected to the control bar lever biasing it in a predetermined direction, whereby said cam means is selectively positioned upon successive actuations of said control bar.

2. Relieving or arrestment mechanism for an analytical balance having cam means for controlling the motion of said mechanism in a direction to render the balance operative and in a direction to arrest the balance, comprising control means for said cam including a quadrant rotatable with said cam and having an arcuate slot, a control bar, a pivoted lever on which the control bar is mounted, motion transmitting linkage pivotally connected to said lever for movement thereby and having a pin engaged in the slot in the quadrant and movable into different positions in said slot by a depression of the control bar, and a spring which is operatively connected to re-set the control bar after each actuation thereof.

3. A relieving or arrestment mechanism as defined in claim 2, wherein said slot is provided at its ends with notches in which said pin is alternatively engageable.

4. A relieving or arrestment mechanism as defined in claim 2, wherein the motion transmitting linkage comprises a link on which said pin is mounted and which is pivotally connected to said lever through the medium of a second link.

5. In an analytical balance control mechanism, a base, a manually operable control bar, a lever on which said bar is mounted pivoted on said base, resilient means biasing said lever in a predetermined direction, motion transmitting linkage pivotally connected to said lever, a rotatable shaft having at least one cam thereon, a part to be controlled having a follower element in contact with said cam, a radially extending member on said shaft, and a pin and slot connection between said member and said linkage, said control bar lever, linkage and member being so related that said member is oppositely rocked upon successive actuations of said control bar to correspondingly selectively position said element.

6. In the analytical balance control mechanism defined in claim 5, said member comprising a slotted quadrant fixed on said shaft, a pin on said arm movable in said slot, and pin retaining means at opposite ends of the slot for holding said quadrant in oppositely rocked positions following successive actuations of said control bar.

References Cited in the file of this patent

UNITED STATES PATENTS

| 1,103,513 | Heusser | July 14, 1914 |
| 1,667,893 | Hem | May 1, 1928 |
| 2,260,691 | Popov | Oct. 28, 1941 |
| 2,297,141 | Gattoni | Sept. 29, 1942 |
| 2,567,161 | Griffin | Sept. 4, 1951 |
| 2,752,146 | Hodsman | June 26, 1956 |
| 2,761,029 | Peabody | Aug. 28, 1956 |